United States Patent [19]

Stella

[11] 4,119,371
[45] Oct. 10, 1978

[54] FILM CASSETTE CONTAINED PROCESSING FLUID APPLICATOR HAVING PARTICLE TRAPPING ARRANGEMENT

[75] Inventor: Joseph A. Stella, Peabody, Mass.

[73] Assignee: Polaroid Corporation, Cambridge, Mass.

[21] Appl. No.: 791,136

[22] Filed: Apr. 26, 1977

[51] Int. Cl.² .............................................. G03C 11/00
[52] U.S. Cl. ................................................... 352/130
[58] Field of Search ................................. 352/130, 72

[56] References Cited
U.S. PATENT DOCUMENTS 3,887,272   6/1975   Weed .................................... 352/130

Primary Examiner—Monroe H. Hayes

Attorney, Agent, or Firm—Frederick A. Goettel, Jr.; David R. Thornton

[57] ABSTRACT

An arrangement for trapping foreign particles such as dust in advance of deposition of processing fluid on a moving run of film strip contained within a multi-purpose film cassette includes at least a pair of longitudinally spaced depending blades forming a recess or channel transverse to the longitudinal axis of the film for collecting dust particles sufficiently large to interfere with the application of processing fluid to the film. Smaller particles which project above the surface of the emulsion on the film strip less than the thickness of the processing fluid coating are permitted to pass through the processing unit without interference to a doctoring surface by which the processing fluid is applied.

7 Claims, 7 Drawing Figures and other foreign particles are prevented from interfer-

FILM CASSETTE CONTAINED PROCESSING FLUID APPLICATOR HAVING PARTICLE TRAPPING ARRANGEMENT

BACKGROUND OF THE INVENTION

This invention relates to photographic film processing apparatus and more particularly, concerns an improved means for trapping foreign particles, such as dust, in advance of processing fluid deposition on an exposed film strip contained within a multi-purpose motion picture film cassette.

Motion picture systems in which exposure, processing and projection operations are carried out on a film strip contained at all times in a multi-purpose cassette are disclosed in several issued U.S. patents, assigned in common with the common invention. In these systems, the strip of film, as supplied with the cassette, is initially wound on a supply spool and advanced to a take-up spool when the cassette is placed in an appropriate camera for exposure in essentially conventional fashion. After exposure, the cassette is placed into a viewing apparatus capable of activating a cassette contained processor to deposit a uniform layer or coating of processing fluid along the length of the film strip as it is rewound from the take-up spool back to the supply spool. Thereafter, the series of successive transparent image frames formed on the film strip may be viewed by projection and rewound for subsequent projection cycles as desired.

The achievement of a uniform layer or coating of processing fluid on the film strip during the processing operation is vital to overall system operation and has been a major focal point of attention in overall system development. The current state of the art with respect to achieving a uniform coating of processing fluid on such cassette contained film strips is represented by the disclosures of U.S. Pat. Nos. 3,871,073 issued Mar. 11, 1975 to Edward F. Burke and Douglas B. Holmes and U.S. Pat. No. 3,951,530 issued Apr. 20, 1976 to Frank M. Czumak, Paul B. Mason and Joseph A. Stella, both of which patents are commonly assigned with the present invention. In the disclosures of these patents, an inclined doctoring surface is used to develop a hydrodynamic force under which the processing fluid is applied uniformly across the width of a film strip advanced linearly under the doctoring surface. The hydrodynamic force is opposed by a yieldable pressure pad operative to support the film strip beneath the doctoring surface in a manner to provide a net balance of forces on opposite sides of the film strip.

Because of the need for cassette ventilation both to dry processing fluid and to cool the film strip during projection, and also because of the environment to which the cassette may be exposed in normal use, it is difficult if not impossible to prevent entry of foreign particles and/or dust to the cassette interior. While the presence of such particles is not a serious problem to film strip exposure and projection, it is critical to proper film strip processing that foreign particles present on the film strip be prevented from accumulating in the region of the doctoring surface by which the processing fluid is spread uniformly onto the film strip. The achievement of a net balance of forces on opposite sides of the film strip as it passes the doctoring surface in accordance with the disclosure of the aforementioned issued U.S. patents has contributed substantially to the solution of this problem by permitting film strip particles to pass the doctoring surfaces without accumulation and without dragging or streaking the processing fluid in a manner to create blemishes which will appear in the viewed images of the processed film. A somewhat more complicated solution is provided by the disclosure of U.S. Pat. No. 3,861,791 issued Jan. 21, 1975 to Edward F. Burke, Jr. and Frank M. Czumak, also commonly assigned with the present invention. In this latter patent, provision is made in the processor for creating a fluid vortex of processing fluid upstream of the final application of the same fluid to the film strip in a manner to effect a removal of particles from the film strip.

While the art relating to cassette contained processors for motion picture systems of the type referred to has reached a highly refined state and by which the problems associated with the entry of dust or other foreign particles to the cassette interior are substantially solved, there is need for added assurance that film strip processing will not be adversely affected by the presence of dust or other foreign particles on the film strip. The acuteness of the need may be appreciated when it is borne in mind that the processor is a once-used structure supplied with a cassette which serves primarily as a package for the initially supplied film strip and a container by which it may be manipulated for exposure and repeated projection cycles.

SUMMARY OF THE PRESENT INVENTION

In accordance with the present invention, the problems associated with the presence of dust or other foreign particles on a film strip during the deposition of processing fluid from a cassette contained processor are minimized substantially by the provision of at least two longitudinally spaced scraper members or blades defining a channel therebetween capable of entrapping foreign particles in advance of the deposition of processing fluid onto the film strip. The blades and the defined channel are formed in an integral nozzle structure through which the processing fluid is fed by gravity and doctored onto the emulsion surface of the film strip as the latter is passed linearly under the nozzle in a rewind direction between cassette contained take-up and supply spools. The blades are formed in the nozzle so as to be at the elevation of, or slightly above the emulsion layer of the film strip by a distance less than the thickness of the processing fluid coating to be applied. Thus, any particle passing both scraper blades will also pass the doctoring surface determinative of the coating thickness. The provision of multiple blades functions not only to provide an accumulative series of foreign particle blockages but also to provide recesses between the blades in which the particles or dust may be retained. Thus in one embodiment of the invention two such blade-like formations defining a single transverse channel are provided whereas in another embodiment a series of more than two such blades defining multiple channels is used.

Among the objects of the invention are therefore: the provision of an improved system for the application of processing fluid to the emulsion side of photographic film strips; the provision of an improved processor for film strips contained in multi-purpose film cassettes; the provision of such a processor having an improved means for avoiding the deleterious effects of film strip carried foreign particles on the deposition of processing fluid; the provision of a nozzle structure for cassette contained processors by which film strip carried dust ring with processing fluid deposition; and the provision of such a nozzle structure capable of manufacture at costs tolerable for a once-used component in mass-produced film cassettes.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENTS

Figure 1:
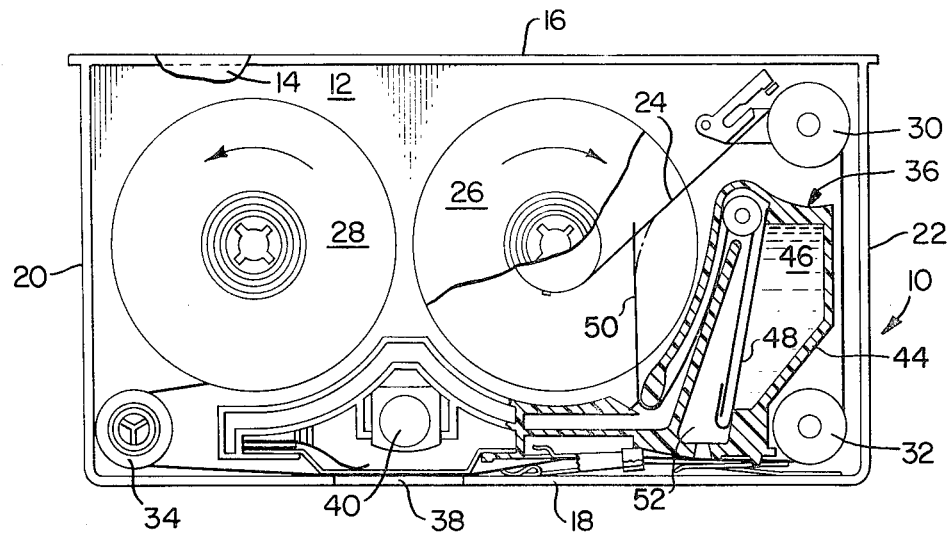
FIG. 1 is a side elevation in partial cross-section illustrating the interior arrangement of a cassette incorporating the present invention.
Figure 2:
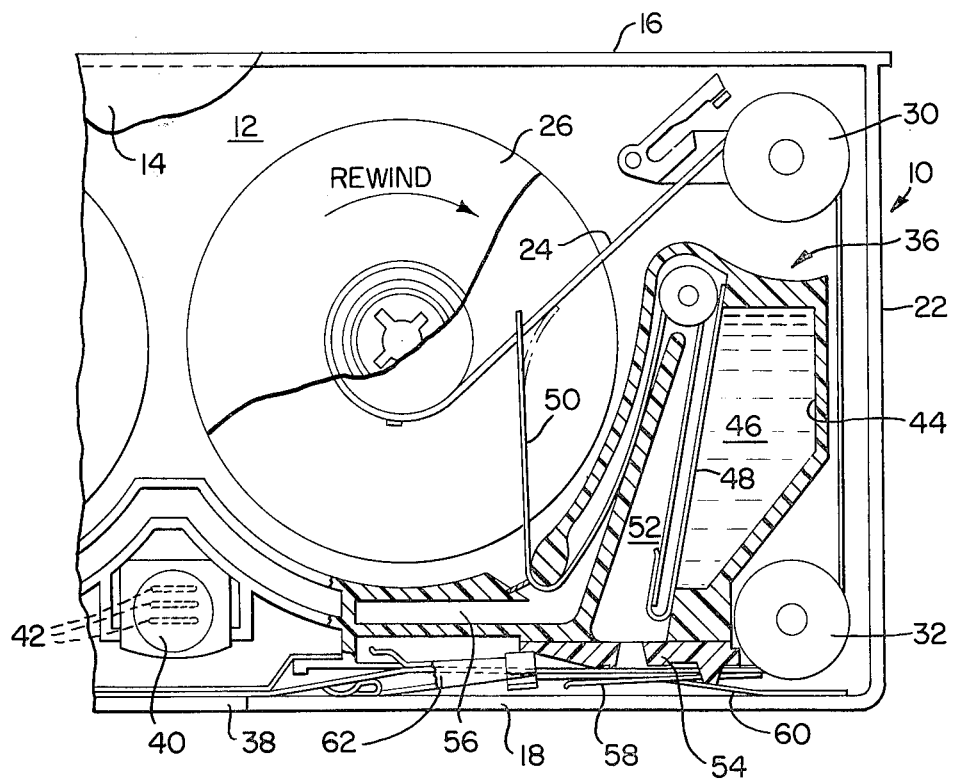
FIG. 2 is a fragmentary side elevation showing the processor of the invention.

In FIGS. 1 and 2 of the drawings, a multi-purpose film cassette incorporating the present invention is shown to include a housing generally designated by the reference numeral 10 and taking the form of a rectangular parallelepiped having a pair of exterior side walls 12 and 14 connected by top, bottom and end walls 16, 18, 20 and 22, respectively. Within the housing 10, a film strip 24 is connected at opposite ends to supply and take-up spools 26 and 28 for movement through a series of linear flights or runs defined by a bobulator roll 30, an idler guide roller 32 and a snubbing roller 34. The run of the film strip 24 between the guide roller 32 and the snubbing roller 34, in passing from the supply spool 26 to the take-up spool 28 transverses a processor, designated generally by the reference numeral 36, and an exposure/projection aperture 38 in the bottom housing wall 18 under a reflecting prism 40 located adjacent ventilating openings 42 in the side wall 12.

As shown more clearly in FIG. 2, the processor 36 includes a reservoir or pod 44 of processing fluid 46 initially sealed by tear strip 48 and connected to a film strip engaging pull strip 50. The construction and operation of the pull strip 50 is fully disclosed in U.S. Pat. No. 3,895,862 issued July 22, 1975 to Joseph A. Stella et al and need not be further described here except to note that upon initiation of a processing cycle, the pull strip becomes engaged by an aperture (not shown) in the trailing end portion of the film strip 24 to pull the tear strip 48 away from the pod or reservoir 44 and allow the processing fluid 46 to flow into a chamber 52 closed at its bottom by an applicator nozzle 54 to be described in more detail below. At the completion of tear strip removal, the pull strip 50 becomes wound between the convolutions of the film strip wrapped on the supply spool 26 whereas the tear strip 48 becomes separated to remain in a storage chamber 56.

Also in accordance with the disclosures of prior patents including those mentioned above, the flight of the film strip 24 between the rollers 32 and 34 is situated between the bottom of the nozzle 54 and a pressure pad 58 biased upwardly by a spring 60 supported in the bottom wall 18 of the housing 10. A valve member 62 is positioned behind the nozzle 54 in the context of film strip travel during exposure and projection (ahead in the context of film strip rewind movement during processing) and is engageable by an aperture (not shown) in the leading end portion of the film strip 24 to be advanced from the position shown to a position underlying the nozzle 54 at the end of a processing operation.

The general organization of cassette components illustrated in FIGS. 1 and 2 as well as the operation of such components during exposure, processing and projection of the film strip 24, without removal thereof from the housing 10, is summarized herein principally for the purposes of providing an understanding of the environment in which the improved structure of the nozzle 54 is used. For example, it will be noted that although the housing 10 constitutes an essentially light-tight enclosure for the film strip 24, openings such as the vent openings 42 and the exposure/projection opening 38, which are important to overall system operation, prevent exclusion of foreign particles such as dust to the housing interior. While the effect of foreign particles on the film strip 24 or otherwise within the cassette interior, during use of the cassette to expose the film strip 24 or to project the transparent image frames formed thereon after processing, is not significantly different that it is on conventional exposure or projection of motion picture film strips, it is important to completely satisfactory operation of the processor 36 that such foreign particles not interfere with the achievement of a uniform layer of the processing fluid 46 on the exposed emulsion layer of the film strip. It is equally important that any system for removing or otherwise preventing interference of such particles with the processing operation does not mar or damage the emulsion layer either physically or chemically prior to processing.

Figure 3:
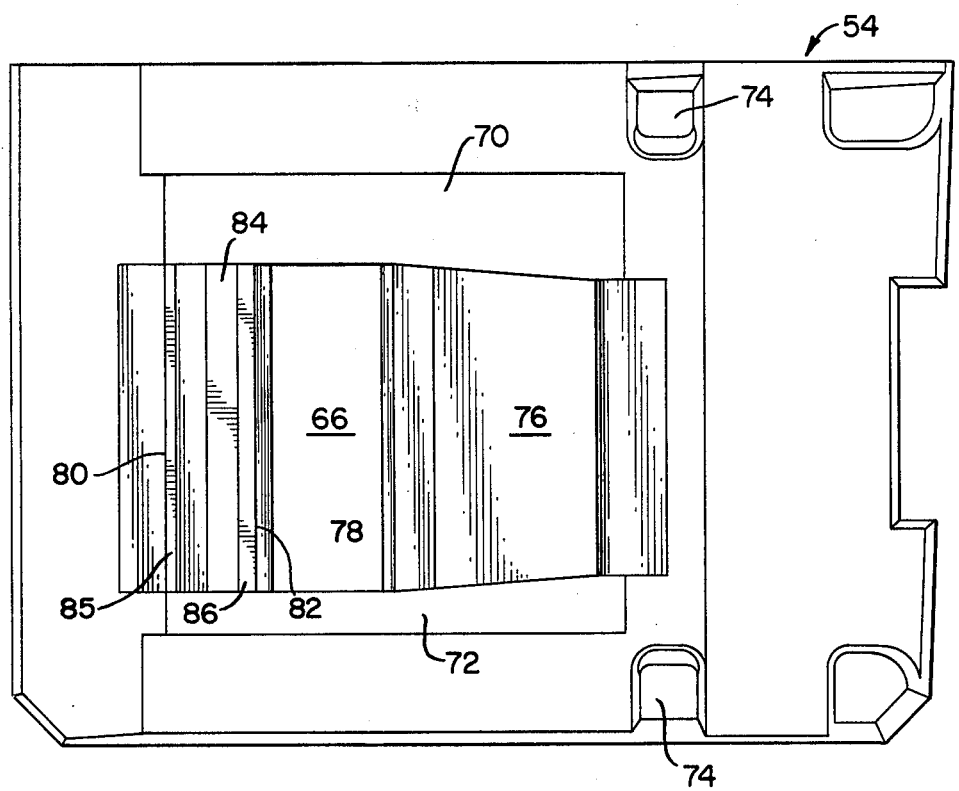
FIG. 3 is an enlarged bottom plan view of a processor nozzle incorporating the invention.
Figure 4:
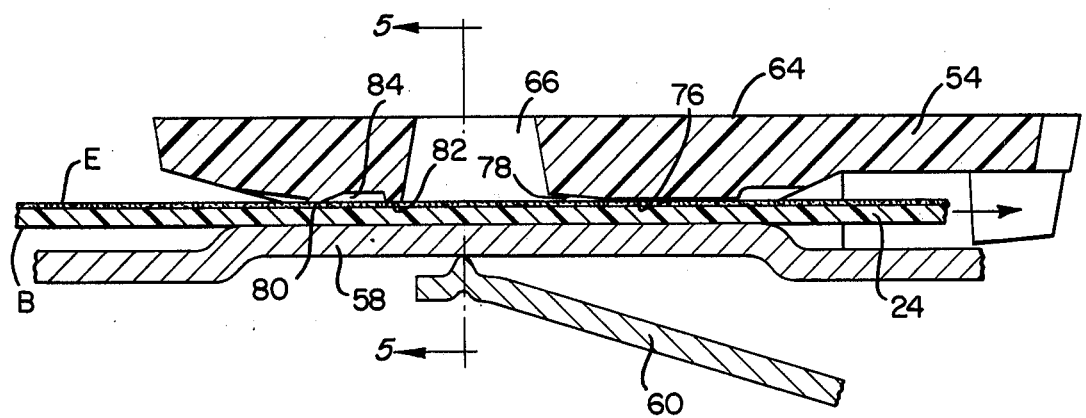
FIG. 4 is a greatly enlarged cross-section of the nozzle portion of the processor.
Figure 5:
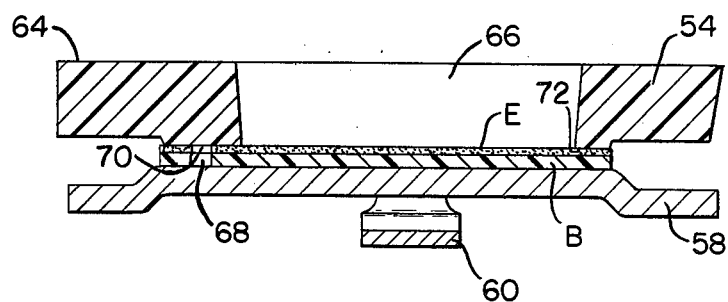
FIG. 5 is a cross-section taken along line 5—5 of FIG. 4.
Figure 6:
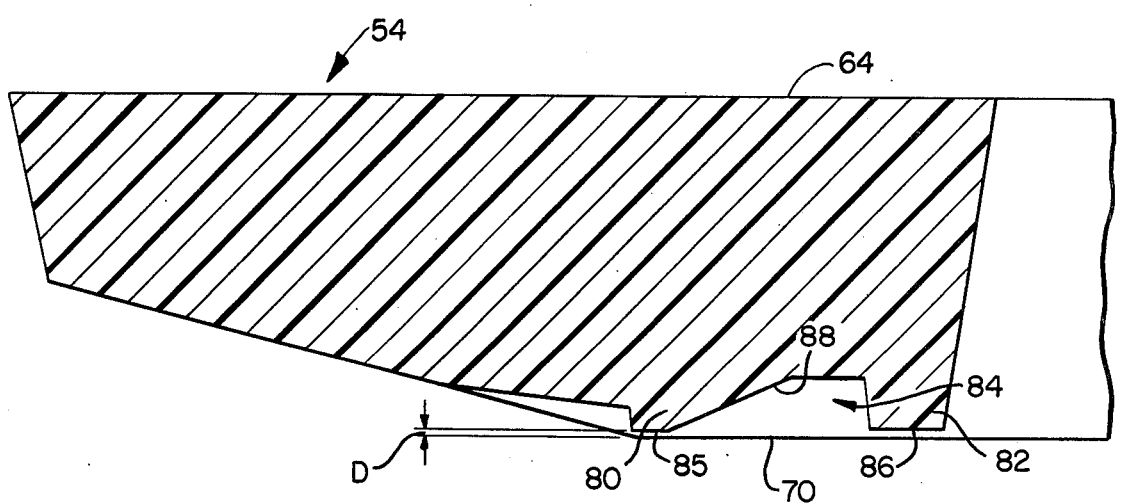
FIG. 6 is a fragmentary cross-section of the leading end portion of the nozzle of FIG. 4 but at a vastly enlarged scale.

An understanding of the improved nozzle structure of the present invention and its use in operation may be gained by reference to FIGS. 3-6 of the drawings in which a preferred embodiment is illustrated. The nozzle 54 is an integral molding of suitable synthetic resinous material having an essentially planar top surface 64 adapted to be secured in a suitable manner such as by ultrasonic welding, thermal fusion or adhesives to the bottom of the processor 36 in the general relationship described above with respect to FIG. 2. A generally rectangular nozzle opening 66 extends from the upper surface 64 to the opposite side or bottom of the nozzle toward which the film strip 24 is urged by the pressure pad 58 during processing. In FIGS. 4 and 5, the film strip 24 is illustrated in greater detail to include an emulsion layer E upon a carrier base B. Also as shown in FIG. 5 of the drawings, it will be noted that the emulsion layer E extends completely across the width of the carrier base throughout framing margins, one of which is wider than the other and provided with feed apertures 68 for engagement by an incremental feed mechanism or shuttle (not shown) during exposure and projection.

The surface configuration of the underside of the nozzle 54 (FIG. 3) presented to the film strip 24 is shown to include elongated film spacers or guide tracks 70 and 72 on opposite sides of the nozzle opening 66, the guide track 70 being somewhat wider than the guide track 72 because of the wider margin required on one side of the film strip to accommodate the feed apertures 68. A pair of post-like abutments 74 depend from the undersurface of the nozzle and function as stops for the valve member 62 described above.

As described and claimed in the commonly assigned copending application Ser. No. 791,025 filed on even date herewith, the configuration of the nozzle 54 to the right of the opening 66 in FIGS. 3 and 4, or downstream from the nozzle opening in terms of film strip travel during processing, is shaped to provide a doctoring surface 76 preceded by an inclined surface 78 extending upwardly and forwardly to the downstream edge of the nozzle opening. Although the doctoring surface 76 in the disclosed embodiment is spaced from and generally parallel to the upper surface of the emulsion layer E by the guide tracks 70 and 72 by a distance approximating 0.0007 inch to provide a processing fluid coating on the order to 0.0005 inch in thickness, the fluid is applied under a hydrodynamic pressure primarily as a result of the converging relationship of the inside edges of the guide tracks 70 and 72 as shown in FIG. 3.

To the left of the nozzle opening 66 in FIGS. 3 and 4 or upstream from the nozzle opening in the context of film strip travel during processing, the film travel being shown by the arrow in FIG. 4, the bottom of the nozzle 54 is provided with a pair of transverse linear projections or scraper blade formations 80 and 82 spaced longitudinally to define a transverse recess 84. As shown most clearly in the enlarged cross-section of FIG. 6, the scraper blade formations 80 and 82 terminate downwardly in planar bottom surfaces 85 and 86 elevated slightly from the surface of the guide tracks 70 and 72 by a distance D. Also it will be noted that the rear portion of the leading scraper 80 is defined by a rearwardly and upwardly inclined surface 88 in the region of the recess 84.

The distance D, between the scraper surfaces 85 and 86 and the guide tracks 70 and 72 is preferably on the order of 0.0001 inch but may approach zero or to a point where the bottom surfaces 85 and 86 of the scraper formations 80 and 82 are truly flush with the surface of the guide tracks. It is important, however, that the scraper formations do not extend below the level of the guide tracks; a slight spacing of the scraper blades above the guide tracks being preferred so that in the processing operation, the bottom surfaces 85 and 86 of the scraper blades exert no pressure on the emulsion layer E of the film strip 24. This is important from the standpoint of avoiding any physical or other adverse effects on the exposed but yet to be processed emulsion layer.

In the processing operation, the film strip is rewound in the described direction (shown by the arrow in FIG. 4) so as to first pass the scraper blade formations 80 and 82, then the nozzle opening 66 and finally the doctoring surface 76 to receive a uniform coating of processing fluid. It is of paramount importance that any dust or other foreignin particles carried on the surface of the emulsion layer E not impede the function of the doctoring surface to provide the uniform layer of processing fluid. Because of the scraper blade formations 80 and 82, any such foreign particles will be prevented from passage with the emulsion to the doctoring surface 76. The chamber represented by the transverse recess 84 will operate to collect any foreign particles passing under the first blade formation 80. Because the distance D is less than the spacing of th doctoring surface 76 above the emulsion layer, any particle that is expected to pass the rearward blade formation 82 will pass cleanly under the doctoring surface without impairing the achievement of the completely uniform coating of processing fluid on the exposed emulsion E.

Figure 7:
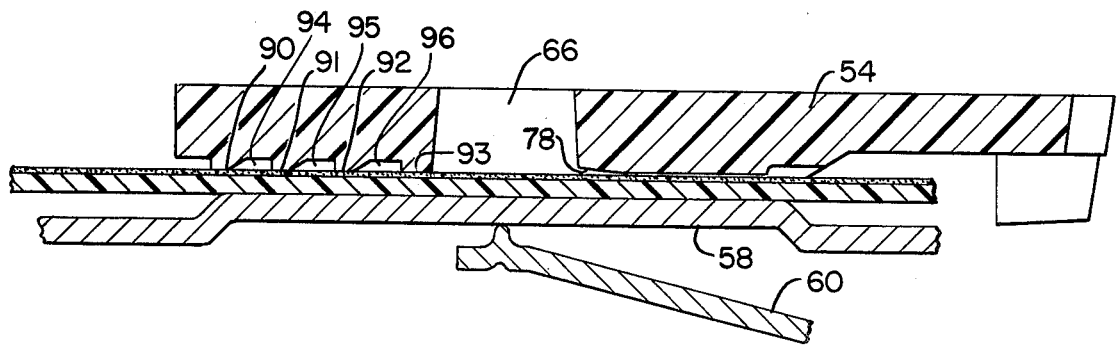
FIG. 7 is a fragmentary cross-section of another nozzle arrangement illustrating an alternative embodiment of the invention.

In FIG. 7 of the drawings, an alternative embodiment of the nozzle 54 is shown and differs from the previously described embodiment only in that four blade formations 90–93 forming three recesses or channels 94–96 are shown rather than the two shown above in the embodiments of FIGS. 3–6. In all other respects, operation of the embodiment of the alternative embodiment illustrated in FIG. 7 is the same except that an added measure of foreign particle entrapment is provided by the increased number of blade formations and channels.

Thus it will be appreciated that as a result of this invention, an improved nozzle structure is provided for photographic film strip processors and by which the above-mentioned objectives are completely fulfilled. Also it will be apparent to those skilled in the art that modifications and/or changes may be made in the illustrated embodiments without departure from inventive concepts manifested thereby. Accordingly, it is expressly intended that the foregoing description is of preferred embodiments only, not limiting, and that the true spirit and scope of the present invention be determined by reference to the appended claims.

What is claimed is:

1. In a cassette containing a strip of photographic film having a light-sensitive emulsion on one surface thereof and a processing fluid applicator for depositing a layer of processing fluid on a moving run of the film strip after exposure of the emulsion, the applicator including an applicator surface positioned to overlie the moving run of the film strip and having a nozzle opening for conducting processing fluid to the film followed by a doctoring surface as viewed with respect to film strip travel during the moving run to provide a processing fluid layer of a given, substantially uniform thickness on the emulsion, the improvement comprising:

particle trapping means on the applicator surface in leading arrangement to the nozzle opening as viewed with respect to film travel during the moving run to block passage to said doctoring surface of particles projecting from the emulsion to a height greater than the thickness of the processing fluid layer, said particle trapping means including at least two scraper blade formations extending transversely across the film strip and spaced apart along the longitudinal axis of the film strip to define a particle receiving channel extending transversely across the film strip.

2. The apparatus recited in claim 1 wherein said scraper blade formations terminate in bottom surfaces spaced from the emulsion by a distance less than the thickness of the processing fluid coating.

3. The apparatus recited in claim 1 wherein the distance between said bottom surface of said scraper blade formations and the emulsion is on the order of 0.0001 inch or less.

4. The apparatus recited in claim 1 including several of said scraper blade formations defining at least a pair of said channels.

5. In a processing fluid applicator for a photographic film cassette which contains a strip of photographic film, the applicator containing a supply of processing fluid to be deposited on an exposed emulsion surface of the film strip in a moving run thereof retained against a pair of downwardly facing guide tracks on opposite sides of a nozzle opening through which the processing fluid is conducted to the film strip, and the applicator also having a doctoring surface located downstream from the nozzle opening in terms of the direction of film run movement, the improvement comprising: at least two scraper blade formations extending transverse to the film strip between the guide tracks upstream from the nozzle opening and spaced apart along the longitudinal axis of the film strip to define a particle receiving channel extending transversely across the film strip.

6. The apparatus recited in claim 5 wherein the lowermost portion of said scraper blade formations are at or slightly above the lowermost surface of the guide tracks, the maximum spacing of the lowermost portions of the blade formations above the lowermost surface of the planar guide tracks being less than the thickness of processing fluid coating to be applied to the film strip.

7. The apparatus recited in claim 5 comprising several of said scraper blade formations defining at least a pair of said channels.

* * * * *